United States Patent [19]
Lagoni

[11] Patent Number: 5,343,255
[45] Date of Patent: Aug. 30, 1994

[54] VIDEO PROCESSING CIRCUIT WITH IF AGC LOOP, AUXILIARY VIDEO CLAMP AND SHARED REFERENCE VOLTAGE SOURCE FORMED ON COMMON INTEGRATED CIRCUIT

[75] Inventor: William A. Lagoni, Indianapolis, Ind.

[73] Assignee: Thomson Consumer Electronics, Inc., Indianapolis, Ind.

[21] Appl. No.: 948,206

[22] Filed: Sep. 17, 1992

[51] Int. Cl.[5] .......................... H04N 5/52; H04N 5/16
[52] U.S. Cl. .................................... 348/678; 348/694; 348/695
[58] Field of Search ................. 358/34, 171, 188, 172, 358/178, 181, 174, 195.1; 348/705, 678, 694, 695, 684, 725; H04N 5/16, 5/52

[56] References Cited

U.S. PATENT DOCUMENTS

| | | | |
|---|---|---|---|
| 4,162,451 | 7/1979 | Arh | 455/333 |
| 4,301,474 | 11/1981 | Jurgensen et al. | 358/171 |
| 4,660,084 | 4/1987 | Filliman et al. | 358/171 |
| 4,660,085 | 4/1987 | Harwood et al. | 358/171 |
| 4,663,668 | 5/1987 | Rabii et al. | 358/171 |
| 4,965,669 | 10/1990 | Canfield et al. | 358/171 |

FOREIGN PATENT DOCUMENTS

| | | | |
|---|---|---|---|
| 0208084 | 8/1989 | Japan | H04N 5/52 |
| 0260329 | 9/1986 | European Pat. Off. | |
| 2181021 | 4/1987 | United Kingdom | |

Primary Examiner—Mark R. Powell
Assistant Examiner—Jeffrey S. Murrell
Attorney, Agent, or Firm—Joseph S. Tripoli; Peter M. Emanuel; Richard G. Coalter

[57] ABSTRACT

A clamp system for use in a television receiver having tuner and auxiliary video sources, comprises an IF AGC and video detector circuit having an AGC reference voltage input and an auxiliary video input signal clamp circuit having a reference voltage input. The detector circuit and the clamp circuit are each formed on a common integrated circuit along with a video switch for selecting video signals provided by said detector and clamp circuits. The integrated circuit further includes a reference voltage source and a bias generator for deriving the AGC reference voltage and the auxiliary input signal clamp voltage from the common source.

6 Claims, 2 Drawing Sheets

VIDEO PROCESSING CIRCUIT WITH IF AGC LOOP, AUXILIARY VIDEO CLAMP AND SHARED REFERENCE VOLTAGE SOURCE FORMED ON COMMON INTEGRATED CIRCUIT

FIELD OF THE INVENTION

This relates to television receivers generally and particularly receivers having auxiliary inputs and provisions for clamping the auxiliary signals.

BACKGROUND OF THE INVENTION

In television receivers having both RF and auxiliary (baseband) video inputs it is common practice to clamp the detected and auxiliary signals to similar levels to avoid picture flashing when switching between different video sources. Filliman et al., for example, in U.S. Pat. No. 4,660,084 entitled TELEVISION RECEIVER WITH SELECTABLE VIDEO INPUT SIGNALS describes a system in which both the RF video source and the auxiliary video source are stripped of their original DC values and clamped to new DC reference voltage. This arrangement prevents picture Hashing when changing between sources but employs a pair of feedback controlled keyed clamps which are relatively costly and complex to implement.

FIG. 2 herein shows an arrangement which is exemplary of a prior art arrangement that is relatively simple in that the auxiliary input signal is clamped via a sync tip clamp to approximately the DC level of the detected video input signal. As shown, the system includes an IF input terminal 201 which receives an IF signal from the receiver tuner. Terminal 201 is connected to an IF AGC loop 220 comprising an IF amplifier 202, a video detector 204, an AGC amplifier 206, an AGC smoothing capacitor 208 and an AGC reference voltage source 207. The AGC loop adjusts the gain of the IF amplifier, so that the DC level of the video detector output equals the AGC reference voltage provided by the reference voltage source (illustrated as a battery) 207. The resultant DC stabilized video signal is supplied to one input of a video switch 212 which receives the auxiliary video input signal via capacitor 214 and supplies a selected video output signal. The auxiliary video input signal is clamped by means of a clamp diode 216 and another reference voltage source 218 that is selected to be a level approximating the DC level of the detected video output signal.

SUMMARY OF THE INVENTION

The prior art system described above has an advantage of relative simplicity over the more complicated keyed synchronous clamping arrangement of Filliman et al. However, it has been found that certain problems can arise with regard to "picture flashing" in the system of FIG. 2 and particularly in the case where the receiver IF circuitry is in one integrated circuit and the auxiliary video clamp is either in another integrated circuit or is designed with discrete components. It has been found that the "picture flashing" problems arise due to the independence of the reference voltage for the AGC loop and the reference voltage for the auxiliary input clamp circuit. Any drift of these two reference voltages relative to each other will result in a blanking level mismatch when switching between video sources and "picture flashing" necessarily will result.

In accordance with the invention, the problem of "picture flashing" is solved by placing the video switch, the IF AGC loop and the auxiliary input clamp in one integrated circuit with the auxiliary video signal clamp voltage and the AGC reference voltage being derived from a single common bias source. In this way voltage variations due, for example, to component tolerances, to production variables or to temperature variations will track to minimize differences between the sync tip voltages of the internal and external signals at the switch inputs. In this way picture flashing will be minimized for all except cases of non-standard blanking of the horizontal synchronizing signal amplitude of the IF detected signals (e.g., as may occur, for example, in the cable TV transmission of sync suppressed scrambled signals).

In accordance with the invention, a clamp system for use in a television receiver having tuner and auxiliary video sources, comprises an IF AGC and video detector circuit having an AGC reference voltage input and an auxiliary video input signal clamp circuit having a reference voltage input. The detector circuit and the clamp circuit are each formed on a common integrated circuit along with a video switch for selecting video signals provided by said detector and clamp circuits. The integrated circuit further includes a reference voltage source and a bias generator for deriving the AGC reference voltage and the auxiliary input signal clamp voltage from the common source.

BRIEF DESCRIPTION OF THE DRAWING

The foregoing and further features of the invention are shown in the accompanying drawing wherein.

DETAILED DESCRIPTION

Figure 1:
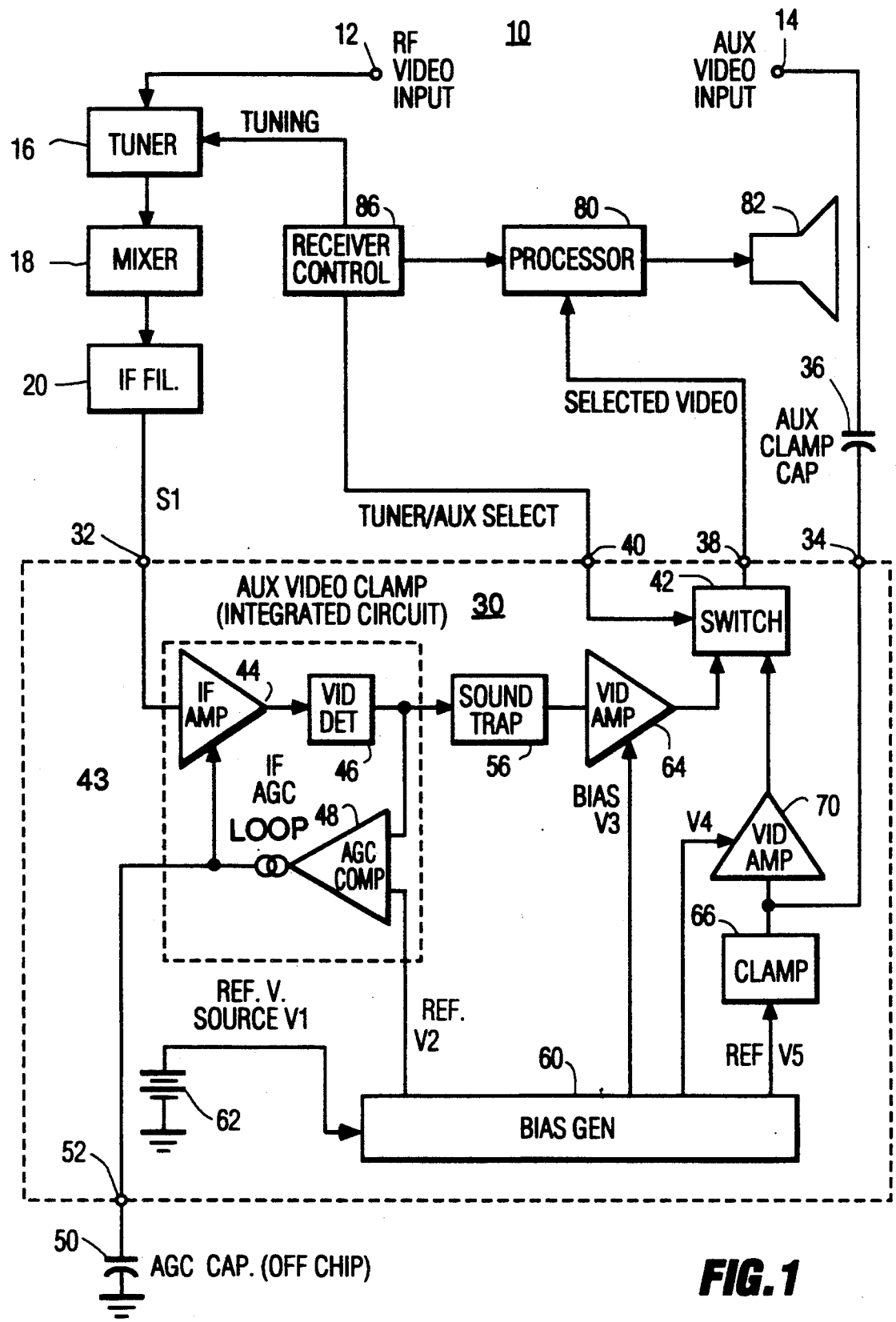
FIG. 1 is a block diagram of a television receiver including an auxiliary video clamp embodying the invention.
Figure 2:
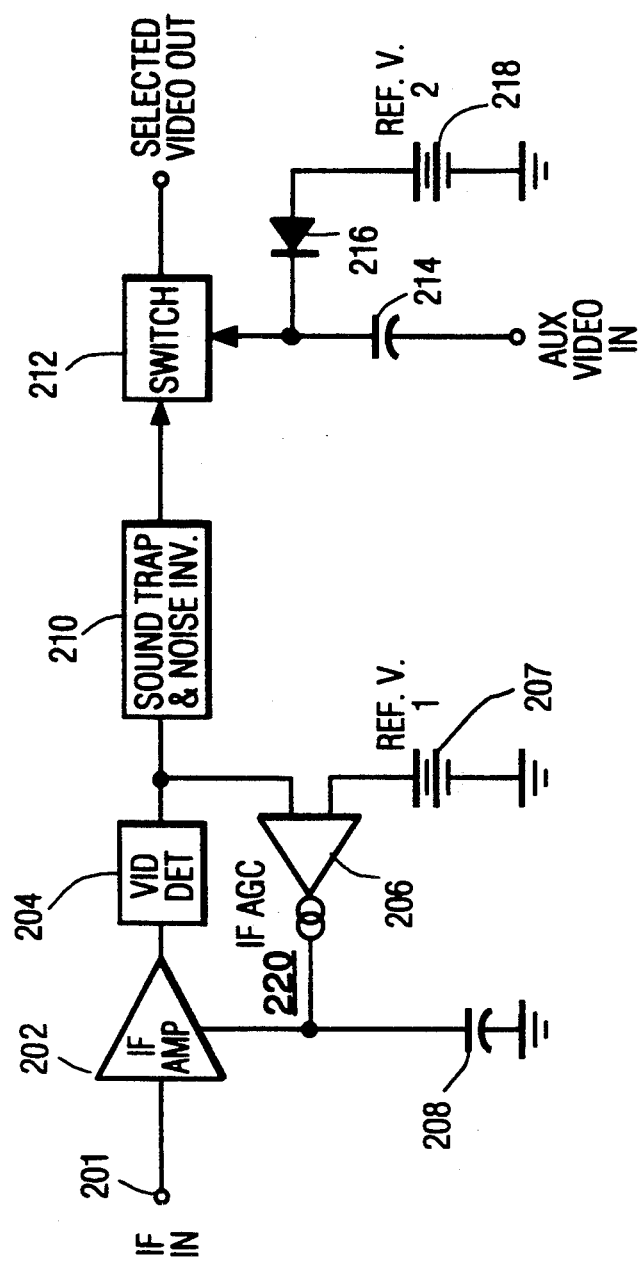
FIG. 2 is a block diagram of a prior art auxiliary video clamp circuit.

The receiver 10 of FIG. 1 includes an antenna input terminal 12 for receiving an RF modulated video input signal and an auxiliary input terminal 14 for receiving a baseband composite video input signal provided by an external source. Terminal 12 is applied to a tuner 16 having an output applied to a mixer 18 which provides an IF frequency signal to an IF filter 20. The IF output signal S1 is applied to the input 32 of an auxiliary video clamp 30 unit (outlined in phantom) which has a second input 34 coupled by a clamp capacitor 36 to input 14 for receiving the auxiliary video input signal. Unit 30 also includes a switch having an output 38 providing a tuner detected composite video signal or the auxiliary clamped video signal. The selected video signal from terminal 38 is applied to a picture processing unit 80 that provides a processed video signal to a display unit 82 (e.g., a kinescope) for display. A receiver control unit 86 (e.g., a control microprocessor) supplies a tuning signal to tuner 16 for channel selection and supplies a tuner/auxiliary selection signal to input 40 of unit 30 to control a video switch 42 that selects tuner or auxiliary video. Control unit also sends various control signals to processor 80 for controlling picture parameters such as hue, saturation, brightness and contrast.

The auxiliary clamp circuit 30 (outlined in phantom) is constructed in an integrated circuit and provides the functions of IF AGC control, tuner video detection and auxiliary video clamping and video signal selection. The IF AGC loop 43 includes an IF amplifier which amplifies the signal at terminal 32 and applies it to a video detector 46 that provides a composite video signal to a sound trap and to one input of the AGC comparator 48. This comparator has a current source output connected to pin 52, to which the AGC capacitor 50 is attached (off chip); and connected to the gain control input of the IF amplifier. The reference voltage V2 for the AGC comparator is provided by a bias generator 60. This generator has an input connected to a reference voltage source 62 (illustrated as a battery for simplicity) which generates a master reference voltage V1. The reference voltage V2 is derived from voltage V1 by means of bias generator 60 which also generates two bias voltages V3 and V4 and a clamp reference voltage V5 for use elsewhere, as will be explained. The closed loop IF AGC system 43 regulates the DC values of the video output signal provided by detector 46 at a value determined by reference voltage V2 and, therefore, in proportion to the main reference voltage V1.

The tuner video signal provided by detector 46 is applied by the sound trap 56 and a video amplifier 64 to one input of the video switch 42. The auxiliary video signal at terminal 34 is clamped to reference voltage V5 by clamp 66 and applied to the other input of switch 42 via a second video amplifier 70. The video amplifiers 64 and 70 receive respective DC bias voltages V3 and V4 provided by the bias generator 60.

In the operation of the system of FIG. 1, the DC component of the video signal from the tuner will be determined by the bias voltage V2 applied to the IF AGC loop and by the bias V3 applied to the first video amplifier 64. The auxiliary input video signal will have a DC component determined by the clamp reference voltage V5 and by the bias (V4) applied to the second video amplifier 70. Since the IF AGC voltage V2, the video amplifier bias voltages V3 and V4 and the clamp reference voltage V5 are all derived from the same primary reference voltage source 62 (V1), the DC component of the auxiliary input video signal can be made essentially equal to that of the tuner supplied video signal and these two d.c. components signals will track each other for changes in temperature, signal level and IC processing tolerances. Accordingly, switching transients are minimized when switching between internal and external video sources and the system performance is not degraded for temperature changes, process tolerances and signal level changes.

Various changes and modifications may be made to the illustrated embodiment of the invention. More inputs may be provided, for example, for additional auxiliary video sources. It will be appreciated that the reference voltage source 62 may comprise a precision reference (a battery is illustrated only for simplicity). The bias generator 60 may be implemented either as a potential divider type or as a current divider type for a given circuit implementation. What is of importance to the present invention is that the bias for the two video amplifiers, for the AGC reference and for the auxiliary clamp be derived from a common source and that the circuit be formed (with the exception of capacitors) in an integrated circuit.

What is claimed is:

1. An IF AGC loop and auxiliary video clamp system for use in a television receiver having tuner and auxiliary video sources, comprising:
an IF AGC loop comprising and IF amplifier for amplifying a video signal provided by said tuner, a video detector coupled to said IF amplifier for providing a baseband video output signal and an AGC comparator for comparing the amplitude of said baseband video output signal with an AGC reference voltage supplied to an AGC reference voltage input thereof and for supplying an AGC gain control signal to said IF amplifier for controlling the gain thereof;
an auxiliary video input signal clamp circuit having an input for receiving an auxiliary video input signal provided by said auxiliary video source, having an output for providing a clamped auxiliary video output signal and having a clamp reference voltage input for controlling the clamping level of said clamped auxiliary video output signal in accordance with a clamp reference voltage applied to said clamp reference voltage input;
said IF AGC loop and said clamp circuit being formed on a common integrated circuit;
a video switch formed on said integrated circuit for selecting the video signals provided by said IF AGC loop and said clamp circuit; and wherein
said integrated circuit further including a reference voltage source and means for deriving said AGC reference voltage and said clamp reference voltage.

2. A system as recited in claim 1, further comprising:
a first terminal on said integrated circuit for coupling said video signal provided by said tuner to said IF amplifier;
a second terminal on said integrated circuit for coupling siad auxiliary video input signal provided by said auxiliary video source to said input of said auxiliary video input signal clamp;
a third terminal on said integrated circuit for applying a selection control signal to a control input of said video switch;
a fourth terminal on said integrated circuit for receiving the video signal selected by said switch; and
a fifth terminal on said integrated circuit for coupling a capacitor, external to said integrated circuit, to a circuit node in said IF AGC loop.

3. A system as recited in claim 1 further comprising a pair of video amplifiers formed on said integrated circuit for coupling said video signals provided by said IF AGC loop and said clamp circuit to respective inputs of said video switch and means for coupling a reference voltage for each video amplifier of said pair of video amplifiers from said bias generator.

4. A method for providing IF AGC control and auxiliary video clamping in a television receiver having tuner and auxiliary video sources, comprising:
forming, in an integrated circuit, an IF AGC control loop including means for (i) amplifying a video signal provided by said tuner, for (ii) detecting said video signal to provide a baseband video signal, for (iii) comparing said baseband video signal with an AGC reference voltage to produce an AGC gain control signal and for (iv) varying the amplification of said video signal in accordance with said AGC gain control signal;
forming, in said integrated circuit, an auxiliary video input signal clamp including means for (i) receiving an auxiliary video input signal provided by said auxiliary video source, for (ii) providing a clamped auxiliary video output signal and for (iii) controlling the clamping level of said clamped auxiliary video output signal in accordance with a clamp reference voltage applied to said clamp reference voltage input;

forming, in said integrated circuit, a video switch for selecting the video signals provided by said IF AGC loop and said clamp circuit; and forming, in said integrated circuit, a reference voltage source and a bias generator for deriving said AGC reference voltage and said clamp reference voltage.

5. A method as recited in claim 4, further comprising the steps of:

forming a first terminal on said integrated circuit for coupling said video signal provided by said tuner to said IF amplifier;

forming a second terminal on said integrated circuit for coupling siad auxiliary video input signal provided by said auxiliary video source to said input of said auxiliary video input signal clamp;

forming a third terminal on said integrated circuit for applying a selection control signal to a control input of said video switch;

forming a fourth terminal on said integrated circuit for receiving the video signal selected by said switch; and forming a fifth terminal on said integrated circuit for coupling a capacitor external to said integrated circuit to a circuit node in said IF AGC loop.

6. A method as recited in claim 4 further comprising the steps of forming a pair of video amplifiers on said integrated circuit for coupling said video signals provided by said IF AGC loop and said clamp circuit to respective inputs of said video switch and deriving a reference voltage for each video amplifier of said pair of video amplifiers from said bias generator.

* * * * *